US012609460B2

(12) United States Patent
Matitsine et al.

(10) Patent No.: US 12,609,460 B2
(45) Date of Patent: Apr. 21, 2026

(54) ARRAY FED RF LENS ANTENNA

(71) Applicant: Matsing, Inc., Irvine, CA (US)

(72) Inventors: Serguei Matitsine, Dallas, TX (US); John Stewart Wilson, San Clemente, CA (US); Igor Timofeev, Dallas, TX (US)

(73) Assignee: Matsing, Inc., Irvine, CA (US)

( * ) Notice: Subject to any disclaimer, the term of this patent is extended or adjusted under 35 U.S.C. 154(b) by 144 days.

(21) Appl. No.: 18/435,349

(22) Filed: Feb. 7, 2024

(65) Prior Publication Data

US 2024/0266757 A1 Aug. 8, 2024

Related U.S. Application Data

(60) Provisional application No. 63/444,186, filed on Feb. 8, 2023.

(51) Int. Cl.

*H01Q 15/02* (2006.01)
*H01Q 3/26* (2006.01)
*H01Q 19/06* (2006.01)
*H01Q 21/24* (2006.01)
*H01Q 21/26* (2006.01)

(52) U.S. Cl.

CPC ............. *H01Q 21/245* (2013.01); *H01Q 3/26* (2013.01); *H01Q 15/02* (2013.01); *H01Q 21/26* (2013.01)

(58) Field of Classification Search

CPC ........ H01Q 15/02; H01Q 15/08; H01Q 19/06; H01Q 21/24; H01Q 21/245; H01Q 21/26; H01Q 3/26; H01Q 3/40

See application file for complete search history.

(56) References Cited

U.S. PATENT DOCUMENTS

| | | | |
|---|---|---|---|
| 3,755,818 | A | 8/1973 | Greenspan |
| 3,765,024 | A | 10/1973 | Chiron et al. |
| 5,703,603 | A | 12/1997 | Korzhenkov et al. |
| 5,821,908 | A | 10/1998 | Sreenivas |
| 6,208,288 | B1 | 3/2001 | Shoucri et al. |
| 6,262,688 | B1 | 7/2001 | Kasahara |
| 6,292,134 | B1 | 9/2001 | Bondyopadhyay |
| 6,329,956 | B1 | 12/2001 | Tateishi et al. |
| 6,356,247 | B1 | 3/2002 | Hirtzlin et al. |

(Continued)

FOREIGN PATENT DOCUMENTS

| | | |
|---|---|---|
| CN | 102176545 | 9/2011 |
| CN | 106716720 B | 2/2020 |

(Continued)

OTHER PUBLICATIONS

US Electrodaynamics, Inc. USEI Teleports, Apr. 2018, 2 pages, usei-teleport.com.

*Primary Examiner* — Tho G Phan

(74) *Attorney, Agent, or Firm* — Fish IP Law, LLP

(57) ABSTRACT

A communication system includes an array of RF elements that transit and/or receive signals through a lens, and a power divider is configured to provide unequal amplitude and/or phase to at least some of the RF elements. In transmit mode, the shape and direction of the resulting beam is controlled in part by the shape of the array, the relative power distributed to the different RF elements, the operating frequency, the shape of the lens, the position of the lens with respect to the array, and the distance of the lens from the array.

14 Claims, 4 Drawing Sheets

(56) References Cited

U.S. PATENT DOCUMENTS

| | | | | |
|---|---|---|---|---|
| 7,042,420 | B2 | 5/2006 | Ebling et al. | |
| 7,151,508 | B2 | 12/2006 | Schaffner et al. | |
| 7,212,169 | B2 | 5/2007 | Ogawa et al. | |
| 7,605,768 | B2 | 10/2009 | Ebling et al. | |
| 7,667,665 | B1 | 2/2010 | Colburn et al. | |
| 8,248,317 | B1 | 8/2012 | Meagher et al. | |
| 8,311,582 | B2 | 11/2012 | Trigui et al. | |
| 9,356,358 | B2 * | 5/2016 | Chang | H01Q 3/06 |
| 9,819,094 | B2 * | 11/2017 | Matitsine | H01Q 21/08 |
| 10,797,381 | B2 * | 10/2020 | DiFonzo | H01Q 25/008 |
| 11,019,506 | B2 * | 5/2021 | Wu | H01Q 19/10 |
| 12,088,375 | B2 * | 9/2024 | Shen | H01Q 3/40 |
| 2003/0043086 | A1 | 3/2003 | Schaffner et al. | |
| 2003/0090416 | A1 | 5/2003 | Howell et al. | |
| 2006/0017637 | A1 | 1/2006 | Howell et al. | |
| 2010/0001900 | A1 | 1/2010 | Imai et al. | |
| 2010/0289698 | A1 | 11/2010 | Ahlberg | |
| 2014/0227966 | A1 | 8/2014 | Artemenko et al. | |
| 2015/0070230 | A1 | 3/2015 | Bradley et al. | |
| 2015/0091767 | A1 | 4/2015 | Matitsine et al. | |
| 2017/0040683 | A1 | 2/2017 | Matitsine et al. | |
| 2017/0070863 | A1 | 3/2017 | Lee et al. | |
| 2018/0131078 | A1 | 5/2018 | Shooshtari et al. | |
| 2021/0159605 | A1 | 5/2021 | Matitsine et al. | |

FOREIGN PATENT DOCUMENTS

| | | |
|---|---|---|
| KR | 1020090040887 | 4/2009 |
| WO | 2008015757 | 7/2008 |

* cited by examiner

ARRAY FED RF LENS ANTENNA

FIELD OF THE INVENTION

The field of the invention is RF frequency antenna and lenses.

BACKGROUND

The background description includes information that may be useful in understanding the present invention. It is not an admission that any of the information provided herein is prior art or relevant to the presently claimed invention, or that any publication specifically or implicitly referenced is prior art.

When selecting antennas for wireless coverage at large gatherings of people at stadiums and venues—outdoor and indoor—it is desirable to create a rectangular pattern coverage where the pattern is near maximum over a rectangular footprint and minimum outside that rectangular footprint.

SUMMARY OF THE INVENTION

The inventive subject matter provides apparatus, systems, and methods in which a communication system includes an array of RF elements that transit and/or receive signals through a lens, and a power divider is configured to provide unequal amplitude and/or phase to at least some of the RF elements. The shape and direction of the resulting beam is controlled in part by the shape of the array, the relative power distributed to the different RF elements, the operating frequency, the shape of the lens, the position of the lens with respect to the array, and the distance of the lens from the array.

Contemplated arrays include at least 3 elements along a first axis and at least 3 elements along a different, second axis. Some contemplated embodiments include at least three elements along a third axis different from the first and second axes.

In some embodiments the power divider is configured to cooperate with the RF elements of an array to concurrently provide different weightings to different beams.

In some embodiments a rectangular beam pattern is formed by feeding the RF lens with a planar array of elements. This allows for a wider beam than produced from a single feed or pair of feeds, and results in a square shaped radiation pattern compared to the more common round pattern when viewed in three dimensions.

In some embodiments a planar array of elements fed with a set of amplitude and phase weights can produce a narrow far-field pattern at a large number of wavelengths from the array. Closer to the array surface, on the order of one wavelength, the wavefront is very broad and follows the square nature of the array. The RF lens transforms this large, wide, square illuminating pattern into a wider beam square shaped pattern. Accordingly, the RF lens is used to transform each feed to a higher gain pattern, directed in a direction consistent with the array geometry, that when combined with a proper weight set produce a highly square shaped pattern.

For indoor and outdoor venues, it is desirable to use antennas with square or rectangular radiation patterns to conform to typical seating which is organized in square and rectangular shapes. Using this type of antenna to cover several sectors, one antenna per sector, is contemplated to improve network performance since there are smaller "holes" in the coverage compared to traditional round patterns found with simple low gain antennas. The ideal pattern has constant power over a square or rectangular shape and rapidly falls off outside the desired coverage area. Using a square or rectangular array of feeds—either on a common ground plane or individual ground planes—can provide this style of pattern.

Various objects, features, aspects, and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
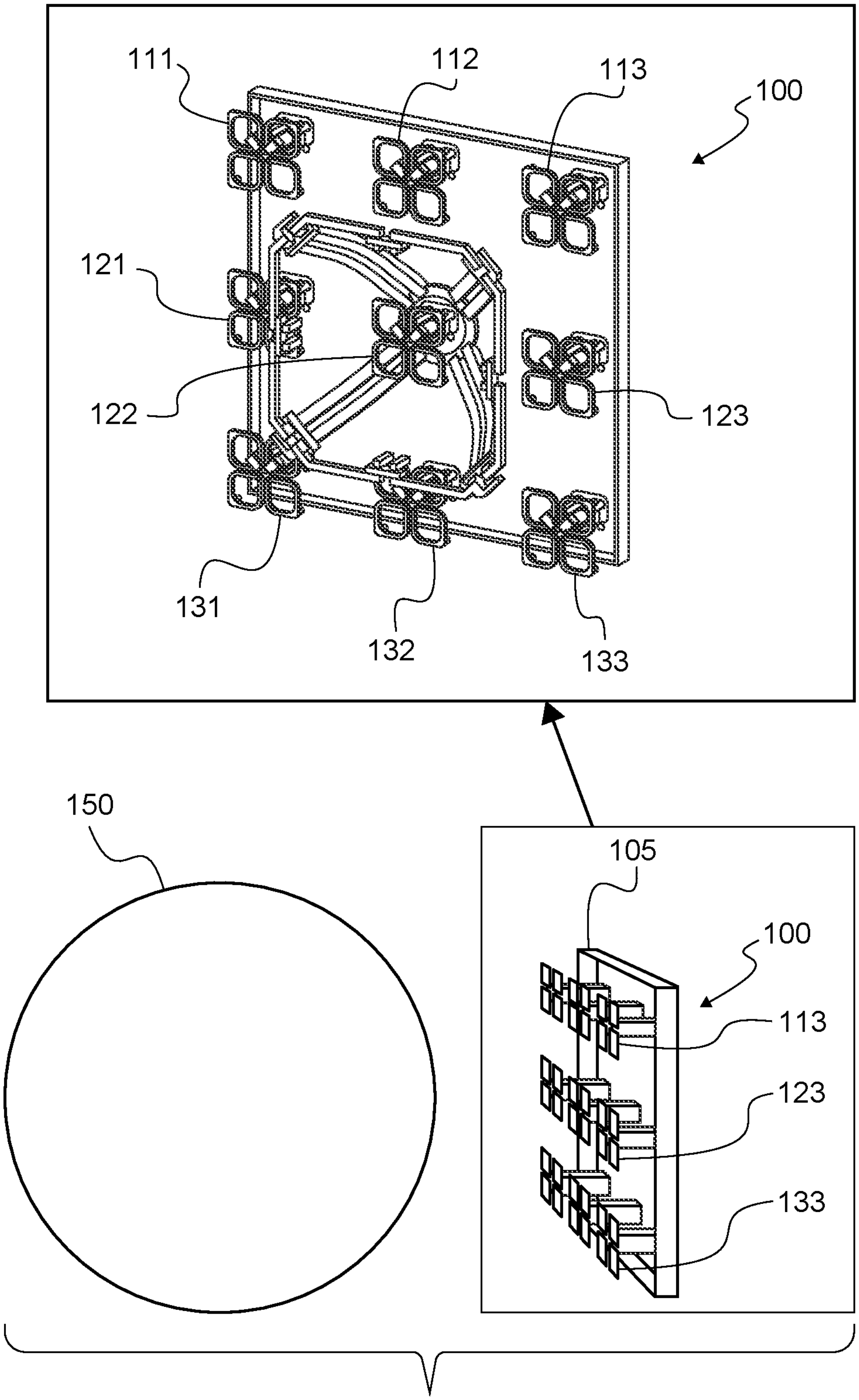
FIG. 1 shows a single band of a 3×3 array 100 of antenna elements 110 on a common ground plane 105 illuminating a RF lens 150.

FIG. 1 shows a single band of a 3×3 array 100 of antenna elements 111, 112, 113, 121, 122, 123, 131, 132, 133 on a common ground plane 105 illuminating a RF lens 150. The RF lens 150 is spherical, but alternative contemplated lenses can be any size, shapes, number of layers and distance to the array 100 as needed to satisfy requirements for a specific antenna. The array of elements 110 transmit/receive in any suitable band or bands, including for example, common wireless bands from 600 MHz to 6 GHz. In some embodiments, the array 100 is configured for operation in wireless bands up to 30 GHz. Although any practical number of elements can be used in either a square, rectangular, trapezoid, other polygon or non-polygon, square is preferred to keep things symmetric for improved cross polarization performance.

FIG. 1 shows the 3×3 array 100 of elements 110 in close proximity to the RF lens 150, roughly one wavelength or less apart. Depending on the application, an array of elements could be placed at other distances to the lens, including at a larger distance of several wavelengths where the 3×3 array of elements to provide a more focused beam.

It is contemplated for arrays to have dual polarization, to provide for a minimum of 2×2 MIMO (multiple input multiple output). 4×4 MIMO can be achieved using a pair of antennas.

Each element of the 3×3 array shown in FIG. 1 can provide a useful pattern. Depending on the requirements for the wireless system, any combination of weight sets can be used. As used herein, the term "weight set" with respect to an array of RF elements means a set of amplitude and phase coefficients applied to different ones of the RF elements, when the antenna is transmitting and receiving at a particular frequency, or over a particular wireless frequency band. A given weight set can result in a large square shaped pattern or anything between that and a traditional round higher gain pattern. For this reason, an array-fed RF lens antenna could be used in a wireless system designed to provide patterns that can adapt to a different environments, for example seats of a ball park or other venue are occupied, and the location of the occupied seats. In some embodiments, the antenna is configured for a trapezoid shaped pattern depending on the application. In contemplated embodiments, the antenna is configured to dynamically shape the resultant pattern as a function of different frequencies, or a broadband signal.

Figure 2:
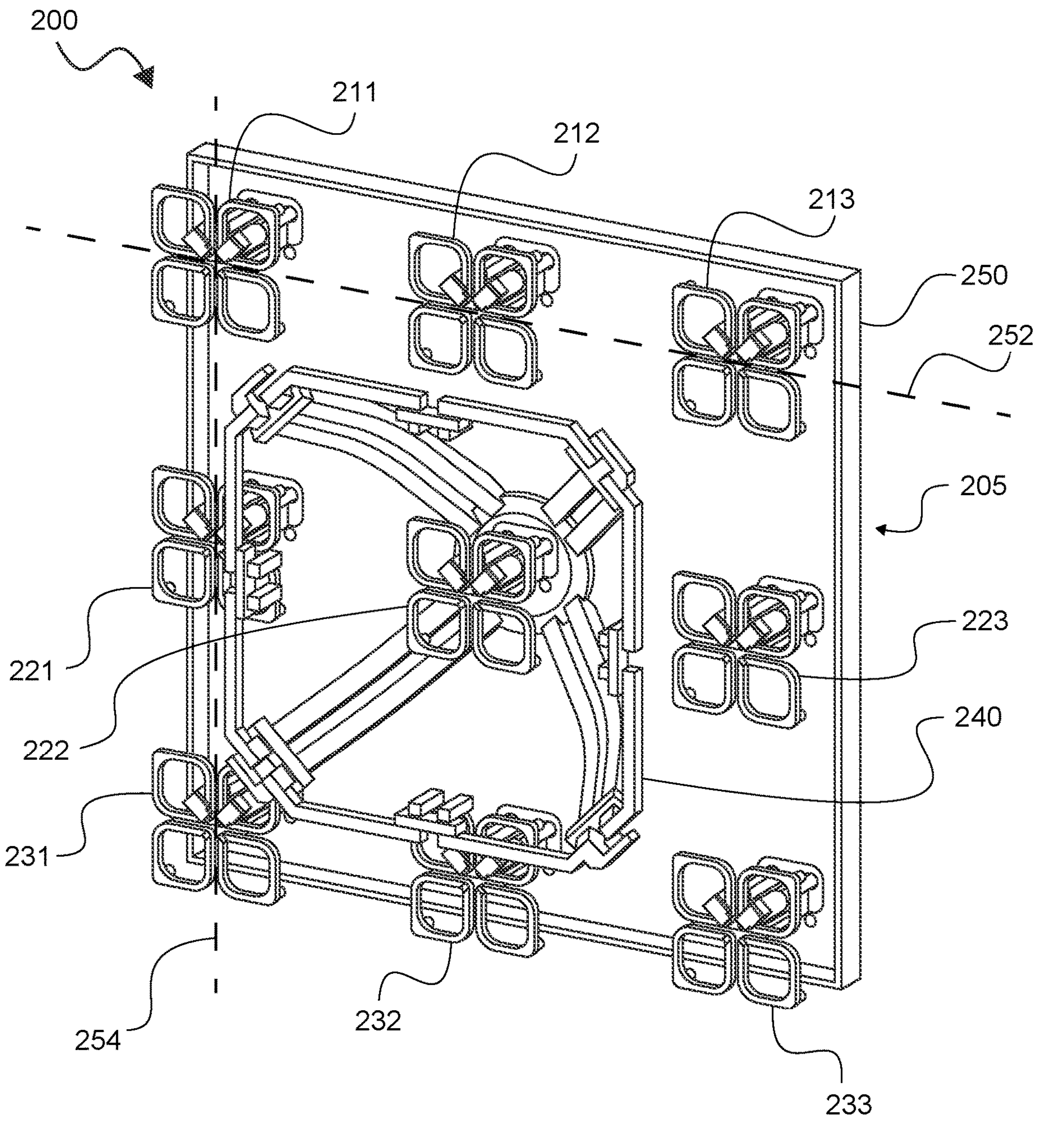
FIGS. 2 and 3 show two different approaches for dual band array feeds. In both cases high band elements are arrayed with an integrated single dual polarized low band element.
Figure 3:
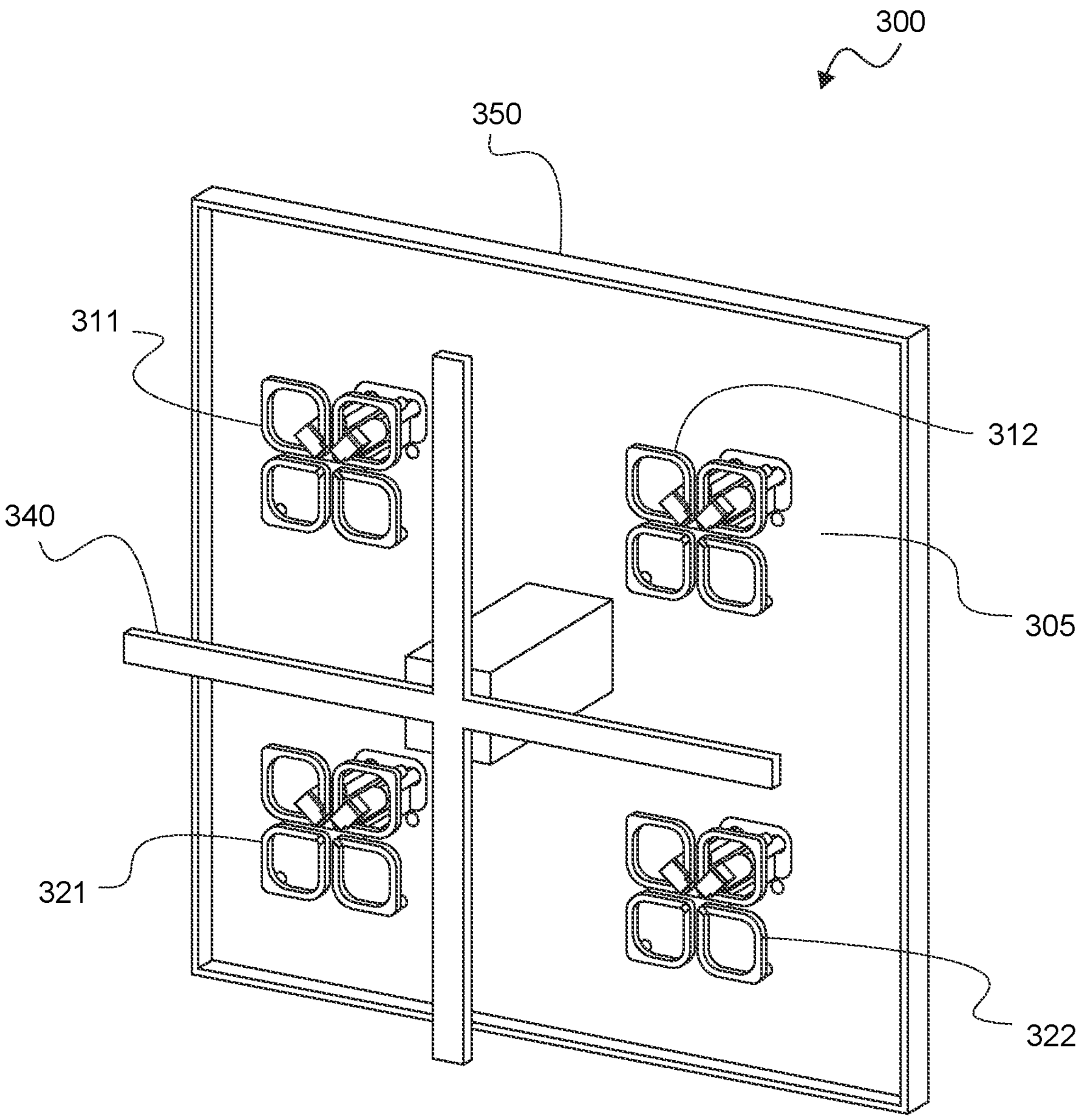

FIGS. 2 and 3 show two different approaches for dual band array feeds. In both cases high band elements are arrayed with an integrated single dual polarized low band element.

In FIG. 2, an antenna system 200 includes a spherical lens (150, not shown), an array 205 of RF elements 211, 212, 213, 221, 223, 231, 232, and 233, a box RF element 240, and common ground plane 250.

In this example, a first set of RF elements 211, 212, 213 is aligned along a virtual horizontal axis 252. Each of a second set of RF elements 221, 222, 223 and a third set of RF elements 231, 232, 233 is also aligned along horizontal axis 252. Each of a fourth set of RF elements 211, 221, 231, a fifth set of RF elements 212, 222, 232, and a sixth set of RF elements 213, 223, 233 are aligned along a virtual vertical axis 254 in a three-dimensional space. Smaller and larger arrays, for example a 2×2 array (not shown), a 4×4 array (not shown) and a 5×5 array (not shown), could each be similarly aligned.

The box RF element 240 is termed a "box" dipole due to the dipole arms arranged in a square of box configuration.

In FIG. 3 antenna system 300 includes a spherical lens (150, not shown), an array 305 with four high band RF elements 311, 312, 321, 322, and a "cross" style low band RF element 340, and common ground plane 350.

Each of the two cases shown in FIGS. 2 and 3 has a single dual polarized low band RF element, 240, 340, respectively. For such configurations the low band will provide a traditional round pattern. In a broader sense, several lower band elements could make up a lower band array integrated or embedded in a larger higher band array. In a preferred embodiment, a planar array is combined with a single array to achieve different shapes for different frequencies.

Figure 4:
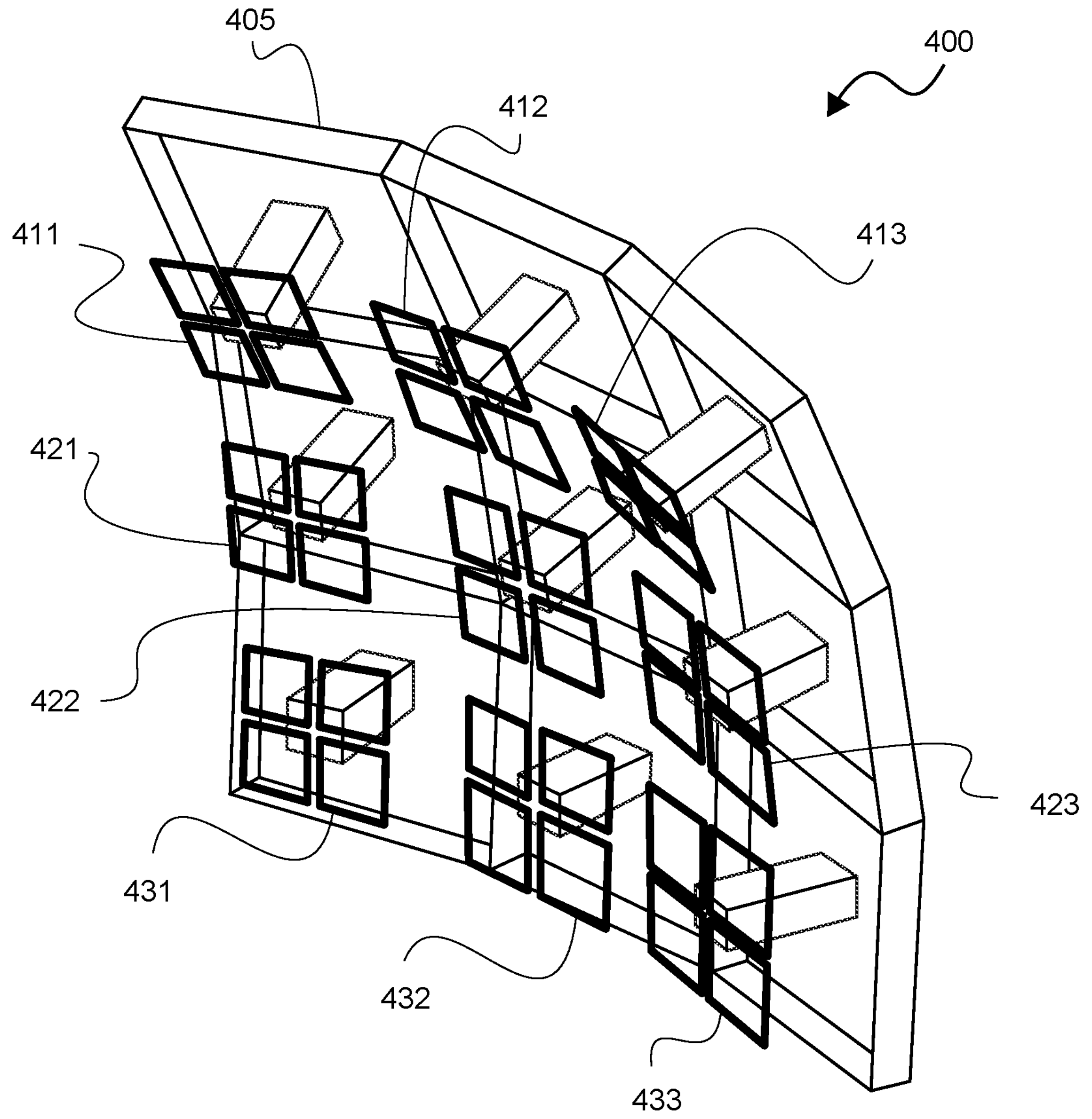
FIG. 4 shows an antenna system having a 3×3 array of nine RF elements.

FIG. 4 shows an antenna system 400 having a spherical lens (150, not shown), a 3×3 array 405 with nine RF elements, 411, 412, 413, 421, 422, 423, 431, 432, and 433. In this embodiment each RF element has its own ground plane that can be oriented separately from the other RF elements and ground planes. As shown, the various RF elements of array 405 are arranged to approximate a double-concave orientation, which would match the exterior curvature of spherical lens 150.

In each of the embodiments of FIGS. 1, 2, 3, and 4, power divider 500 provides amplitude and phase weight sets to two or more of the RF elements to produce a beam.

It should be appreciated that alternative arrays of RF elements could have any practical number of N rows by M columns, where N and M can be any practical integer greater than one. Thus, in linear arrays (not shown) where N is 1, M can be 2, 3, 4, etc.

The examples shown here use a spherical RF lens 150 but the approach can be used with any type of RF lens, this could include truncated spherical lens, lenses of any number of layers and dielectric constants, lenses of other shapes including cylindrical, elliptical, and lenses based on transforming common shapes like spherical and cylindrical to provide more compact geometries.

What is claimed is:

1. A communication system comprising:

a lens illuminated by an array having a first set of at least two RF elements aligned along a first axis, and a second set of at least two RF elements aligned along a different, second axis, wherein the first and second axis intersect;

wherein the first set of RF elements is configured to apply a first weight set and the second set of RF elements is configured to apply a different second weight set; and wherein concurrent application of the first weight set by the first set of RF elements and the second weight set by the second set of RF elements to illuminate the lens produces a rectangular shaped beam pattern.

2. The communication system of claim 1, wherein at least one of the RF elements is configured for dual polarization.

3. The communication system of claim 1, wherein the first and second sets of RF elements are coupled to a common ground plane, and the common ground plane is oriented to a first position as a function of the first weight set.

4. The communication system of claim 3, wherein the common ground plane is oriented to a second position as a function of the second weight set.

5. The communication system of claim 3, wherein the ground plane has a double concave shape.

6. The communication system of claim 1, wherein the first weight set comprises a first amplitude coefficient and a first phase coefficient.

7. The communication system of claim 1, wherein the first set of RF elements are configured to produce a first beam as a function of the first weight set, and the second set of RF elements is configured to produce a second beam as a function of the second weight set.

8. The communication system of claim 1, wherein the first set of RF elements is configured for a first beam polarization, and the second set of RF elements is configured for a second beam polarization.

9. The communication system of claim 8, wherein the first beam polarization is the same as the second beam polarization.

10. The communication system of claim 8, wherein the first beam polarization is different than the second beam polarization.

11. The communication system of claim 1, wherein the first RF elements are high band and the array further comprises a cross-style low band RF element.

12. The communication system of claim 1, wherein the array further comprises a box RF element having a box dipole.

13. The communication system of claim 1, wherein the lens is spherical.

14. The communication system of claim 1, wherein the array comprises a 3×3 arrangement of RF elements.

* * * * *